Nov. 15, 1966 — HEINZ-GÜNTHER MÜLLER VOM HAGEN — 3,285,207
EXTENSIBLE SUPPORT COLUMN
Filed Jan. 19, 1965 — 3 Sheets-Sheet 1
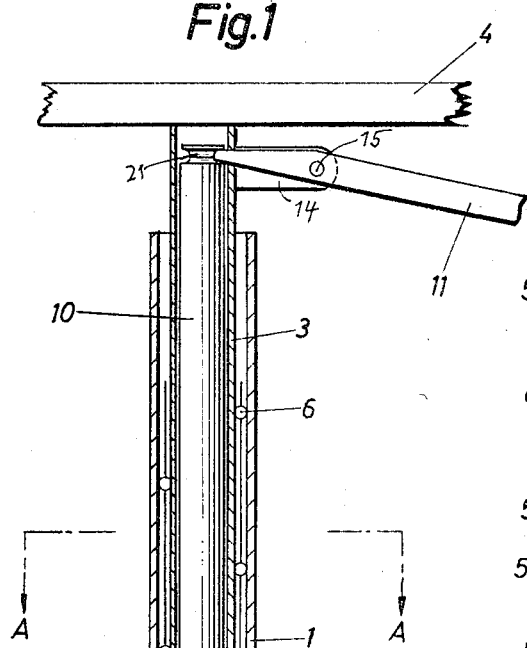
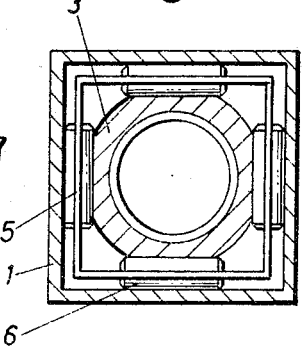
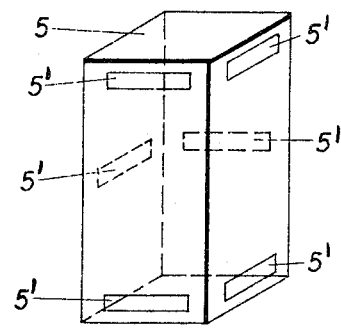
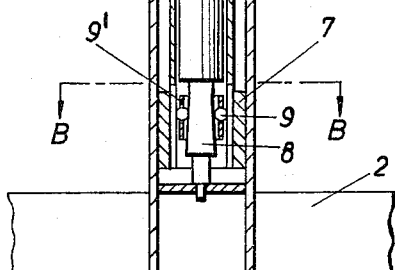
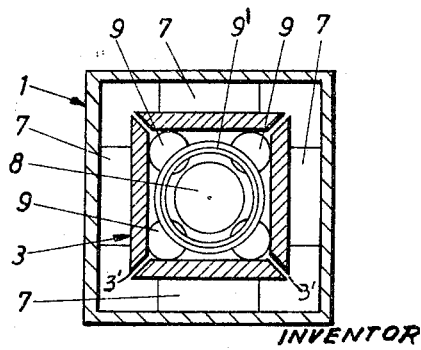
INVENTOR
HEINZ-GÜNTHER MÜLLER VOM HAGEN
By Kurt Kelman
AGENT Nov. 15, 1966
HEINZ-GÜNTHER MÜLLER VOM HAGEN
3,285,207
EXTENSIBLE SUPPORT COLUMN
Filed Jan. 19, 1965
3 Sheets-Sheet 3
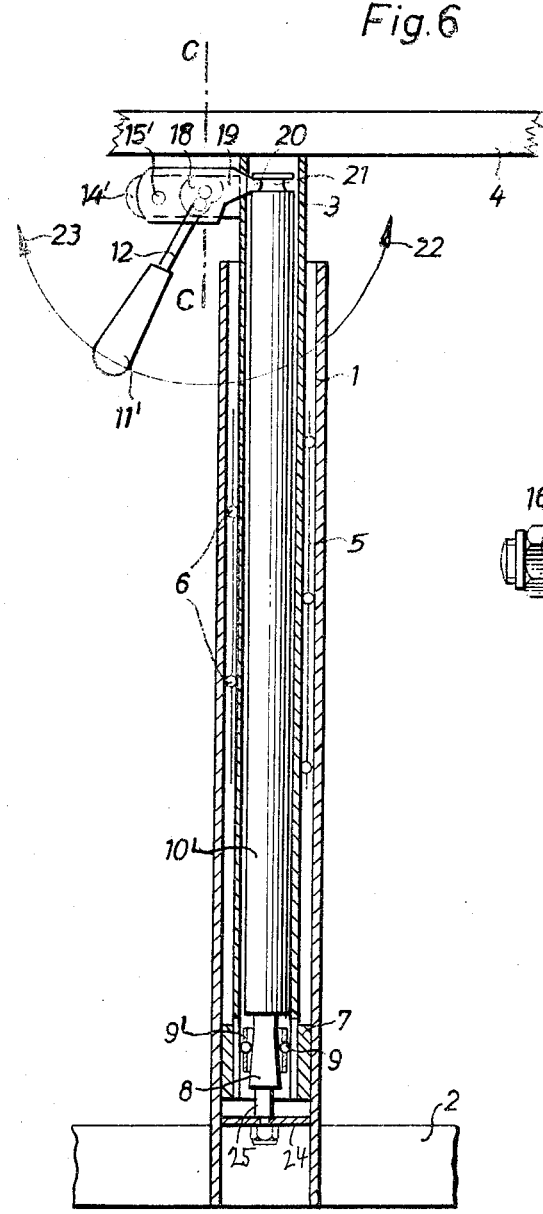
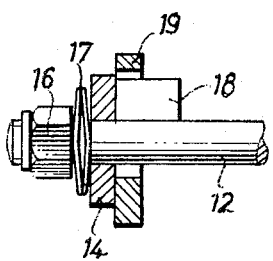
INVENTOR
HEINZ-GÜNTHER MÜLLER VOM HAGEN
BY Kurt Kelman
Agent

United States Patent Office 3,285,207
Patented Nov. 15, 1966

3,285,207
EXTENSIBLE SUPPORT COLUMN
Heinz-Günther Müller Vom Hagen, Uslar, Hannover, Germany, assignor to Ilse-Werke KG, Uslar, Hannover, Germany
Filed Jan. 19, 1965, Ser. No. 426,629
Claims priority, application Germany, Dec. 22, 1964, J 27,191
11 Claims. (Cl. 108—144)

The present invention relates to improvements in extensible support columns, such as furniture legs, and more particularly to supports for vertically adjustable furniture parts, for instance table tops, chair seats and the like, wherein two coaxially telescoping elongated members are secured for torsionless guidance of one member reciprocatingly gliding in the other member.

Furniture having one or more extensible columns vertically adjustably supporting an upper part is known. In conventional furniture of this type, the guidance of one of the supporting column members in the other member is often not sufficiently accurate and dependable for the entire extension path. Also, the movable member is not fully secured against torsion during the vertical movement. These shortcomings are particularly disadvantageous in tables or chairs used in such places as laboratories or medical treatment rooms, and often restrict the use of such adjustable furniture for such and many other purposes.

It has been proposed to arrange ball bearings between the telescoping column members to guide the one member in the other during extension. However, since there is only point contact between the ball bearings and the column member surfaces or walls, wear of the balls after some time of use causes an undesirable play between the supporting column members. This increases the lability of the column and decreases its resistance to torsion during extension. This disadvantage is further aggravated by the fact that it is conventional to use only two diagonally opposed ball bearings to obtain a certain elasticity of the outer tubular column member and thus to accommodate oversized balls placed under prestress in the interspace between the column members. However, this elasticity of the outer column member is rapidly subjected to an overload, due to the torsion of the movable inner column member, so that the outer column will be permanently deformed and thus increase the instability of the support.

All of these and other disadvantages are overcome in accordance with the present invention by providing antifriction roller bearings which transmit the gliding force of the inner column member to the outer tubular member of the support along the longest possible linear contact area.

The bearings being oversized in relation to the interspaces between the column members, they are prestressed on being introduced into these spaces. This prevents play between the columns because the bearings will subject the outer column member to deformation only within the elasticity limits of the column member and do not subject the outer column to milling forces unavoidable with the point contacts provided by ball bearings. Permanent deformations of the outer column member are thus prevented and the inner column member will be guided without torsion and play within the outer column member during extension for an extended period of use.

According to one feature of the invention, each of the telescoping supporting column members has a plurality of flat surfaces extending rectilinearly in the direction of the column axis, the surfaces defining, respectively, inner walls of the outer member and outer walls of the inner member. Associated ones of the surfaces of the two members define rectilinearly extending spaces therebetween and these interspaces are arranged in pairs of diametrically opposed spaces wherein the antifriction bearings are arranged. If the support column is relatively short, for instance in the use for low tables, such as coffee tables, pairs of roller bearings may be mounted in pairs of opposite interspaces. In longer support columns, it is preferred according to one feature of the invention to arrange the bearings in pairs of opposed interspaces in axially staggered relationship. In the latter case, one space of each of the pairs of opposed spaces has one antifriction bearing less than the other one of the spaces of each pair. This arrangement produces a secure guidance of the inner in the outer column member because the same radial pressures are exerted by the prestressed rollers in all directions against the elastic outer column member, the inner member having substantially unyielding walls.

According to another feature of the invention, brake means is arranged in the support column for temporarily fixing the glidingly arrangement column member at a desired level in respect of the other column member. Means is provided for actuating the brake means from outside the extensible column so that the movable column member may be temporarily held at any desired adjusted vertical level. Such a brake means is particularly useful if the extension of the support column is power-driven in any suitable conventional manner. In such a case, the brake means must be released to permit operation of the power drive for extending the column and must then be engaged again to hold the column at the desired length. While this forms no part of the present invention, a useful drive for the column extension is a piston-and-cylinder drive operated by compressed gas, in which case such a pneumatic motor means itself may serve as the brake means.

It has been proposed to use an operating lever which is pivoted about a horizontal axis for actuation of the brake means. Conventional operating levers of this type have the disadvantage, however, that they extend downwardly in the brake engaging position and must be pushed or pulled upwardly when the brake is to be released.

When such a mechanism is used on tables, for instance, it has the serious disadvantage that, in the braking position, the lever extends unpleasantly between the legs of persons sitting around the table while it must be pressed upwards against the table plate to release the brake, which necessitates an uncomfortable hand grip on the lever handle, the thumb being pressed against the underside of the table plate and the other fingers gripping the lever handle to pull it toward the plate. Also, this arrangement brings with it the constant danger of erroneous operation wherein it is attempted to release the brake by pushing the lever handle downwardly, leading either to deformation of the lever and/or to destruction of the entire brake operating mechanism.

According to one feature of the present invention, the inner column member is also tubular and a rod is axially reciprocable within, and coupled to, this inner member for engaging and releasing the brake means. The reciprocating means for the rod comprises, according to one embodiment of this invention, a catch engaging a groove in the upper end of the rod, a lug affixed to the inner column member, the catch being pivotally mounted on the lug, and an operating handle for pivoting the catch. The operating handle is mounted on the lug adjacent and underneath the table plate or other upper furniture part and has an axle rotatable in the lug about an axis perpendicular to the colmmn axis. The handle is rotatable through an angle of about 180° between two end positions wherein the handle extends generally parallel to the upper furniture part, i.e. the table top or plate. Means is provided for stopping the handle in any desired position. The handle axle extends also generally parallel to this part so that the operating mechanism is at all times more or less flat against the underside of the upper part and does not interfere with the knee room under the table, for instance. Also, the handle is operated easily by gripping it and no erroneous operation is possible.

In accordance with one preferred feature of this invention, the brake means includes brake shoe means carried by a radially expansible lower end of the inner column member for frictional engagement with the outer column member. The reciprocable rod in the inner member carries a conical element at its lower end, which tapers toward the lower rod end. Ball bearings are arranged around the conical element and in the corners of the radially expansible lower end of the inner column member, the balls being diagonally opposed to each other and thus assuring proper and prompt expansion of the lower end of the inner column end upon raising of the axially reciprocable rod. This brake means arrangement assures dependable and prompt brake engagement and disengagement.

The above and other objects, features and advantages of the present invention will become more apparent in the following detailed description of certain preferred embodiments thereof, taken in conjunction with the accompanying drawing wherein FIG. 1 is a side view of a piece of furniture showing the extensible support column according to one embodiment of this invention in vertical section;

FIG. 2 is a transverse section along line A—A of FIG. 1;

FIG. 3 is a perspective view of an anti-friction bearing cage useful in the invention;

FIG. 4 is a transverse section along line B—B of FIG. 1;

FIG. 6 is a view similar to that of FIG. 1 and showing the extensible leg of FIG. 5; and FIG. 7 is a vertical section along line C—C of FIG. 6.

Figure 5:
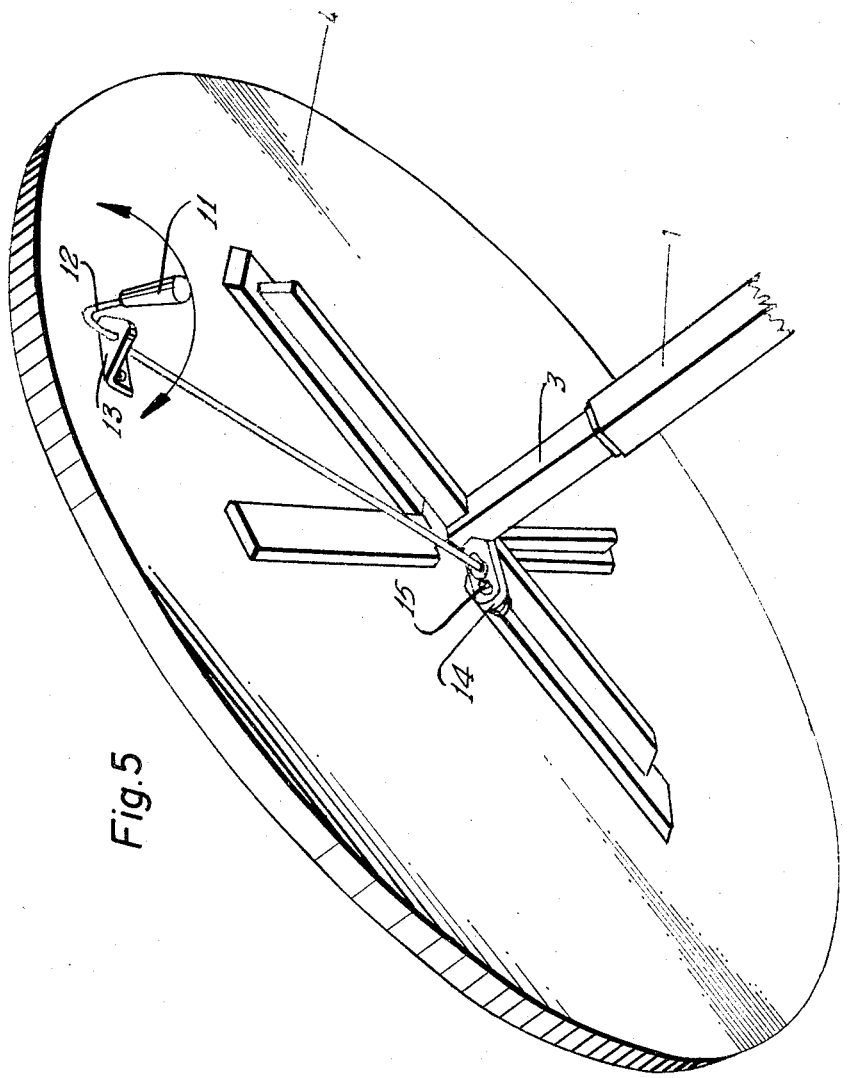
FIG. 5 is a perspective view of a table, taken from underneath, incorporating an extensible leg according to the invention.

Referring now to the drawing and first to FIGS. 1 to 4, FIG. 1 shows an extensible support column having a vertically extending axis and comprising two coaxially telescoping elongated members 1 and 3, member 3 being slidably guided in tubular member 1. A pedestal 2 supports the tubular member 1 and a part 4, which may be a table plate, is carried by the other member 3 at an adjustable distance from the pedestal so that the extensible column constitutes an adjustable leg for part 4.

As best seen in FIG. 2, each of the column members has a plurality of flat surfaces extending rectilinearly in the direction of the column axis and these surfaces define, respectively, inner walls of the one member 1 and outer walls of the other member 3. Associated ones of these surfaces define rectilinearly extending spaces between the two telescoping members, and these interspaces are arranged in diametrically opposed pairs.

In the illustrated embodiment, both members 1 and 3 are tubular and of rectangular transverse cross section. However, this cross section may obviously be of a different regular polygonal cross section, such as hexagonal or octagonal.

Antifriction bearing means 5, 6 is arranged in the spaces between the flat surfaces of the two telescoping members 1 and 3 to guide the reciprocating gliding movement of member 3 in respect of member 1, the bearing means being so arranged in accordance with the present invention as to secure the column against torsional distortion. For this purpose, the antifriction bearing means includes antifriction bearings illustrated as rollers 6 engaging the flat surfaces of the members 1 and 3, and mounted in the opposed pairs of the spaces (see FIGS. 1 and 2) in axially staggered relationship (see FIGS. 1 and 3). One space of each of the opposed pairs of spaces has one antifriction bearing 6 less than the other one of the spaces of each pair.

In the illustrated embodiment, a cage 5 defining a plurality of horizontally extending slots 5' (FIG. 3) holds the antifriction rollers 6 for free rotation therein. As will be seen from FIG. 3, in this preferred embodiment, the antifriction rollers are arranged in pairs, each of the pairs of bearings lying in a horizontal plane spaced from an adjacent pair of bearing rollers. Thus, the antifriction bearing rollers engage the surfaces of members 1 and 3 in a plurality of axially spaced planes.

As will be noted from FIG. 2, the member 3 has walls of curvilinear transverse cross section and its flat surfaces are defined by flattened portions of these arcuate walls.

The antifriction bearing rollers 6 are prestressed, the prestressing being accomplished by making the bearings oversized in relation to the interspaces between the telescoping column members so that the rollers are prestressed when they are introduced into the interspaces.

In this antifriction bearing arrangement, the gliding forces between the two telescoping members are transmitted over very large rectilinearly extending surfaces and play between the two relatively moving members is prevented by the prestress in the rollers.

The roller bearing cage may be made of any suitable rigid material, such as metal or plastic. Preferably, the cage 5 consists of a plastic sheet having a plurality of axially extending rectilinear score lines along which the sheet is folded to provide a number of cage walls corresponding to the number of the interspaces between the telescoping column members.

According to this invention, the reciprocating member 3 may be held in any adjusted vertical position in member 1 by brake means mounted in at least one of the interspaces, actuating means being provided for operating the brake means from outside the extensible column. The brake means comprises brake shoe means 7, 7 mounted on member 3 and frictionally engageable with the tubular member 1.

In the embodiment shown in FIGS. 1 and 4, the reciprocating member 3 also is tubular and has a radially expansible lower end. Radical expansion of the lower end is attained by slitting this lower end at 3', 3' at the corners defined by adjacent flat surfaces of the lower end of member 3. Each of these surfaces carries a brake shoe 7 which frictionally engages the corresponding flat surface of tubular member 1 upon expansion of the lower end of member 3. The actuating means includes a rod 10 having an upper end and a lower end, the rod being axially reciprocable within the tubular member 3. A conical element 8 is carried by the lower rod end and tapers toward the lower rod end. Ball bearings 9, 9 are arranged around conical element 8 and in the corners of the radially expansible lower end of member 3. In the illustrated embodiment, a ball bearing cage 9' is arranged between the conical element and the lower end of member 3 to hold the balls 9 in the most favorable position for attaining radial expansion of the lower end of member 3 by reciprocation of conical element 8, i.e. in the corner 3'.

The means for reciprocating the rod 10 illustrated in FIG. 1 is a two-armed lever 11 pivoted intermediate its ends at 15 to a lug 14 on the member 3. One arm of the lever constitutes an operating handle while the other arm ends in a catch engaging an annular groove 21 at the upper end of rod 10, the catch end extending into the groove through a slot in member 3.

The extensible leg shown in FIGS. 5 and 6 is identical in all respects to the embodiment of FIG. 1, except for the reciprocating mechanism for brake means actuating rod 10. To avoid prolixity, like parts are designated by like reference numerals in these figures so that the description thereof need not be repeated. I prefer to us a pneumatic motor means for raising part 4 smoothly and in stepless motion. For this purpose, rod 10 is constituted by a cylinder having one chamber filled with a gas, such as nitrogen, under high pressure and pressing downwardly against a piston glidably mounted in the cylinder on fixed piston rod 25 secured to abutment 24 mounted in column member 1. The piston rod passes gas tightly through an axial bore in element 8. When the brake is released the gas pressure against the piston will smoothly raise the table. When the brake is engaged, the raised table is securely locked in position. The table may be lowered by releasing the brake and pressing the table top downwardly.

As best shown in FIGS. 6 and 7, the operating handle 11' is mounted on lug 14' adjacent and underneath the table plate 4, the lug being mounted on, and extending radially from, the leg member 3. The handle has an axle 12 and nut 16 is threadedly mounted over one end of the handle axle which is rotatably journaled in a bearing hole in the lug. A spring means constituted by disc springs 17 is arranged in the space defined between lug 14' and nut 16 whereby the rotational position of axle 12 is frictionally secured and the handle may be stopped in any desired position until and unless the friction is overcome by pressure on handle 11'. Rotation of nut 16 adjusts the frictional force.

The handle axle 12 is rotatable in the lug about an axis perpendicular to the axis of the supporting column or leg and the handle is rotatable through an angle of about 180° between end positions indicated by arrows 22, 23. As shown in FIGS. 5 and 6, the handle axle extends generally parallel to the table plate 4 and the handle extends from the other end of the handle axle away from the table plate and at an angle to the handle axle. In the indicated end positions 22, 23, the handle extends generally parallel to the table plate. A support bracket 13 is affixed to the underside of table plate 4 and supports the handle axle 12 adjacent the handle 11'.

The operating handle axle 12 has a cam 18 keyed thereto and the cam engages a cam follower means in catch 19, this cam follower means being a curvilinear cutout in the catch and the cam extending into this cutout (FIG. 7). The catch is pivoted to lug 14' at 15' and has a nose 20 engaging the annular groove 21 in the upper end of rod 10. Turning of the handle 11' rotates axle 12 and the cam 18 keyed thereto, thereby pivoting catch 19 and axially reciprocating rod 10.

As seen in FIG. 6, when handle 11' is moved to the right towards or into position 22, rod 10 is raised, the expansible end of leg member 3 is expanded and the brake means engages the inner walls of leg member 1 to hold the table plate in a desired, vertically adjusted position. When the handle is turned leftwards towards or into position 23, the rod is lowered, the tapered end of the conical element 8 is adjacent balls 9 and the lower end of member 3 is permitted to return to its rest position, thus removing the brake shoes 7, 7 from frictional engagement with the inner walls of leg member 1 so that the leg member 3 may be freely moved vertically in leg member 1.

Spring means 17 holds the handle automatically in any desired position whereinto it has been turned by sufficient pressure overcoming the force of the springs.

The table shown in FIG. 5 is of the type having a round table plate supported by a single leg at the center of the plate, radially extending support struts 26, 26 extending from leg member 3 to provide adequate support for the plate.

While the present invention has been described and illustrated in connection with certain now preferred embodiments, it will be clearly understood that many modifications and variations may occur to the skilled in the art, particularly after benefiting from this teaching, without departing from the spirit and scope of this invention as defined by the appended claims.

I claim:
1. An extensible furniture leg consisting of a support column having a vertically extending axis and comprising
   (a) two coaxially telescoping elongated members one of which members is a tubular member and the other one is slidably guided in the tubular member,
       (1) each of said members having a plurality of flat surfaces extending rectilinearly in the direction of the column axis, said surfaces defining, respectively, inner walls of said one member and outer walls of said other member, the walls of at least one of said members being elastically deformable associated ones of the surfaces of the two members defining rectilinearly extending spaces therebetween, and said spaces being arranged in pairs of diametrically opposed spaces;
   (b) a furniture part carried by the other member at an adjustable distance from the tubular member;
   (c) anti-friction roller bearing means arranged in the spaces between the flat surfaces of the two telescoping members and making line contact therewith,
       (2) the rollers of the anti-friction bearing means being mounted in the opposed spaces of said pairs in axially staggered relationship and one space of each of said pairs of spaces having one bearing roller less than the other one of the spaces of each of said pairs,
       (3) each of said rollers being pre-stressed;
   (d) brake means mounted in said column for temporarily fixing the slidably guided column member in said tubular column member and including brake shoe means mounted on said other member and frictionally engageable with the inner walls of said one tubular member; and
   (e) means for actuating the brake means from outside the extensible column.

2. The extensible furniture leg of claim 1, wherein said rollers are oversized in relation to said spaces whereby they are prestressed by the elastically deformable walls on being introduced into said spaces.

3. The extensible furniture leg of claim 1, wherein the other member also is tubular and has a radially expansible lower end having said plurality of flat surfaces, adjacent ones of said surfaces defining corners and said brake shoe means consisting of brake shoes carried by said surfaces and frictionally engaging the flat surfaces of the one tubular member upon expansion of the lower end of the other member; and said actuating means including a rod having an upper and a lower end, and axially reciprocable within said other member, a conical element carried by said lower rod end and tapering towards said lower rod end, ball bearings arranged around said conical element and in the corners of the radially expansible lower end of the other member, and means for reciprocating the rod.

4. The extensible furniture leg of claim 3, wherein the rod reciprocating means comprises a catch engaging a groove in the upper end of the rod, a lug on said other member, the catch being pivotally mounted on the lug, and an operating handle for pivoting the catch.

5. The extensible furniture leg of claim 4, wherein said catch extends into the groove through an axially extending slot in the other member.

6. The extensible furniture leg of claim 4, wherein said operating handle is mounted on the lug adjacent and underneath said furniture part, the handle having an axle rotatable in said lug about an axis perpendicular to the column axis and the handle being rotatable through an angle of about 180°, and means for stopping the handle in any desired position.

7. The extensible furniture leg of claim 6, wherein said stopping means comprises a nut threadably mounted over one end of said handle axle, said axle end extending through a bearing hole in said lug and a space being defined between the lug and the nut, and spring means arranged in said space between the lug and the nut; and cam means is keyed to said axle and engaging cam follower means in the catch whereby turning of the handle rotates the cam means and pivots the catch for axial reciprocation of the rod.

8. The extensible furniture leg of claim 4, wherein said operating handle has an axle having one end rotatably mounted in said lug adjacent and underneath said part, said axle extending generally parallel to said part, the handle extending from the other end of the handle axle away from said part and at an angle to the handle axle, and said axle being rotatable to place the handle in respective end positions wherein the handle extends generally parallel to said part.

9. In a table comprising a pedestal, an extensible table leg having a vertically extending axis on said pedestal and a table plate carried by the extensible leg at an adjustable distance from the pedestal, the leg including
(a) two coaxially telescoping elongated members one of which members is a tubular member and the other one is slidably guided in the tubular member,
(1) each of said members having a plurality of flat surfaces extending rectilinearly in the direction of the column axis, said surfaces defining, respectively, inner walls of said one member and outer walls of said other member, the walls of at least one of said members being elastically deformable, associated ones of the surfaces of the two members defining rectilinearly extending spaces therebetween, and said spaces being arranged in pairs of diametrically opposed spaces;
(b) anti-friction roller bearing means arranged in the spaces between the flat surfaces of the two telescoping members and making line contact therewith,
(2) the rollers of the anti-friction bearing means being mounted in the opposed spaces of said pairs in axially staggered relationship and one space of each of said pairs of spaces having one bearing roller less than the other one of the spaces of each of said pairs,
(3) each of said rollers being prestressed, (c) brake means mounted in said column for temporarily fixing the slidably guided column member in said tubular column member; and
(d) means for actuating the brake means, said actuating means including
(4) a lug on said other member and an operating handle, said operating handle having an axle having one end rotatably mounted in said lug adjacent and underneath the table plate, said axle extending generally parallel to said table plate, the handle extending from the other end of the handle axle away from said table plate and at an angle to the handle axle, and said axle being rotatable to place the handle in respective end positions wherein the handle extends generally parallel to the table plate.

10. The table of claim 8, further comprising a support bracket affixed to said table plate and supporting said handle axle adjacent said handle.

11. The extensible furniture leg of claim 1, further comprising a pneumatic motor means arranged to move the slidably guided column member in the tubular member for extension of the furniture leg when the brake means does not fix the slidably guided column member in the tubular member.

References Cited by the Examiner

UNITED STATES PATENTS

| | | | |
|---|---|---|---|
| 1,048,143 | 12/1912 | Franke | 108—148 X |
| 2,010,290 | 8/1935 | Campbell | 108—148 |
| 2,025,721 | 12/1935 | Broulhiet | 308—6 |
| 2,364,191 | 12/1944 | Campbell | 108—148 |
| 2,422,775 | 6/1947 | Conner | 308—6 |
| 2,846,278 | 8/1958 | Blazek | 308—6 |
| 2,854,078 | 9/1958 | Conner | 308—6 |
| 2,947,556 | 8/1960 | Wenger | 248—161 X |
| 2,952,145 | 9/1960 | Thompson | 308—6 |

FOREIGN PATENTS

| | | |
|---|---|---|
| 1,178,244 | 12/1958 | France. |
| 558,935 | 1/1944 | Great Britain. |

FRANK B. SHERRY, *Primary Examiner.*

JAMES T. McCALL, *Assistant Examiner.*